United States Patent
Mair et al.

(10) Patent No.: US 9,857,011 B2
(45) Date of Patent: Jan. 2, 2018

(54) CONNECTIONS FOR SUBSEA PIPE-IN-PIPE STRUCTURES

(71) Applicant: Subsea 7 Limited, Sutton (GB)

(72) Inventors: John Arthur Mair, Aberdeen (GB); Christian Geertsen, Louveciennes (FR); Wayne Grobbelaar, Louveciennes (FR)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 14/374,509

(22) PCT Filed: Jan. 25, 2013

(86) PCT No.: PCT/GB2013/050167
§ 371 (c)(1),
(2) Date: Jul. 24, 2014

(87) PCT Pub. No.: WO2013/110947
PCT Pub. Date: Aug. 1, 2013

(65) Prior Publication Data
US 2014/0375049 A1   Dec. 25, 2014

(30) Foreign Application Priority Data
Jan. 25, 2012 (GB) .................................. 1201243.1

(51) Int. Cl.
*F16L 39/00* (2006.01)
*F16L 58/18* (2006.01)
(Continued)

(52) U.S. Cl.
CPC ........... *F16L 39/005* (2013.01); *F16L 58/181* (2013.01); *F16L 59/20* (2013.01); *B23P 19/04* (2013.01);
(Continued)

(58) Field of Classification Search
CPC ....... F16L 9/18; F16L 9/19; F16L 9/20; F16L 39/00; F16L 39/005; F16L 13/0227;
(Continued)

(56) References Cited

U.S. PATENT DOCUMENTS 3,693,665 A    9/1972  Veerling et al.
4,157,023 A    6/1979  Tisdale et al.
(Continued)

FOREIGN PATENT DOCUMENTS

EP    0 071 551    2/1983
EP    0 360 028    3/1990
(Continued)

*Primary Examiner* — James M Hewitt, II
(74) *Attorney, Agent, or Firm* — Levy & Grandinetti

(57) ABSTRACT

A reelable connection between facing ends of opposed pipe-in-pipe sections in which an end wall connects inner and outer pipes of each section to seal an end of an annular space defined between those pipes is disclosed. In each section, the inner pipe protrudes beyond the end wall and the outer pipe and is joined to an inner pipe of the opposed section, leaving opposed ends of the outer pipes of those sections spaced from each other. An insert positioned between the opposed ends of the outer pipes maintains the outer pipe diameter from one section to the other section across the connection.

27 Claims, 4 Drawing Sheets

(51) Int. Cl.
   *F16L 59/20*   (2006.01)
   *F16L 1/18*    (2006.01)
   *F16L 1/20*    (2006.01)
   *B23P 19/04*   (2006.01)

(52) U.S. Cl.
   CPC .............. *F16L 1/18* (2013.01); *F16L 1/207* (2013.01); *Y10T 29/49879* (2015.01)

(58) Field of Classification Search
   CPC ......... F16L 59/20; F16L 58/181; F16L 1/207; F16L 1/18
   See application file for complete search history.

(56) References Cited

U.S. PATENT DOCUMENTS

| | | |
   |---|---|---|
   | 4,219,224 A | 8/1980 | Hanley |
   | 4,243,345 A | 1/1981 | Cha et al. |
   | 6,000,438 A | 12/1999 | Ohrn |
   | 6,446,321 B1 | 9/2002 | Marchal et al. |
   | 7,013,935 B1 * | 3/2006 | Bonn ..................... 141/311 A |
   | 2009/0078742 A1 | 3/2009 | Pasquali et al. |
   | 2010/0282353 A1 * | 11/2010 | Baylot et al. ............... 138/114 |
   | 2011/0186169 A1 | 8/2011 | Pionetti et al. |

FOREIGN PATENT DOCUMENTS

| | | |
   |---|---|---|
   | GB | 2 191 842 | 12/1987 |
   | GB | 2 315 835 | 2/1998 |
   | GB | 2 339 251 | 1/2000 |
   | GB | 2 453 438 | 4/2009 |
   | WO | WO 2008/053251 | 5/2008 |
   | WO | WO 2009/085051 | 7/2009 |

* cited by examiner

CONNECTIONS FOR SUBSEA PIPE-IN-PIPE STRUCTURES

This Application is the U.S. National Phase of International Application Number PCT/GB2013/050167 filed on Jan. 25, 2013, which claims priority to Great Britain Patent Application No. 1201243.1 filed on Jan. 25, 2012.

BACKGROUND OF THE INVENTION (1) Field of the Invention

This invention relates to pipe-in-pipe or 'PiP' structures suitable for subsea applications.

PiP structures are used, for example, in the offshore oil and gas industry as flowlines to transport hydrocarbons across the seabed and from the seabed toward the surface. They may also be used as flowlines to transport other fluids such as hot water.

PiP structures comprise an inner pipe and an outer pipe in concentric relation, spaced from each other along most of their length to define an annulus between them. They provide a high degree of thermal insulation because the annulus typically contains an insulating material and/or is evacuated to restrict heat transfer between the inner pipe and the outer pipe. They also enhance mechanical strength and leak protection by virtue of their double-walled construction.

The most common purpose of insulation in a subsea PiP structure is to retain heat in hydrocarbons or other hot fluids flowing within the inner pipe serving as the flowline, by resisting heat transfer from those fluids to the much colder water surrounding the outer pipe. However, subsea cryogenic pipelines are also known for the transportation of liquefied gases such as LNG; in that case, PiP structures may be used to resist heat transfer from the water surrounding the outer pipe to the fluid flowing at very low temperatures within the inner pipe.

PiP structures are known to be suitable for offshore fabrication on, and laying from, a pipelaying vessel using J-lay or S-lay techniques, the latter including Steep S-lay. In those techniques, PiP sections or 'pipe joints' are welded successively at field joints to an upper end of a pipe string extending from a hang-off structure of the vessel toward the seabed. The welds are tested and the field joints are coated before each section of the pipe string is lowered into the sea. The repetitive welding, testing and coating operations lie on the critical path and so influence the laying rate.

(2) Description of Related Art

WO 2008/053251 to Acergy discloses PiP sections suitable for onshore prefabrication and explains how they may be used in J-lay operations as an example. Each PiP section comprises an inner pipe section that protrudes at each end from a shorter outer pipe section, with the inset ends of the outer pipe section being swaged conically toward and welded to the inner pipe section to close the annulus. This leaves ends of the inner pipe section protruding from the outer pipe section. Once closed, the annulus can be evacuated during the prefabrication process, removing that operation from the critical path during subsequent offshore operations.

U.S. Pat. No. 6,446,321 to ITP is referenced in WO 2008/053251 as an example of a swaging technique.

When one of the PiP sections of WO 2008/053251 is to be added to the pipe string on a pipelaying vessel, protruding ends of abutting inner pipe sections are butt-welded together to form a field joint in the flowline. Once the weld is tested, an insulating and protective sleeve is slid along an outer pipe section into alignment with the field joint to be fixed to the outside of the outer pipe sections around the field joint. Finally, the void around the field joint between the sleeve, the protruding ends of the inner pipe sections and the swaged ends of the outer pipe sections is filled with a resin.

In contrast to J-lay or S-lay techniques, reel-lay operations involve winding or spooling a continuous pipe of welded elements onto a reel carried by a pipelaying vessel, to be unwound or unspooled and straightened during pipelaying at sea. Fabrication and winding of the pipe typically takes place at a spoolbase that the vessel visits when necessary for loading.

At the spoolbase, multiple standard pipe joints are welded together to form very long stalks, which may for example be 750 m or more in length. Efficiently, stalks can be assembled and stored while a pipelaying vessel is away from the spoolbase on pipelaying operations. When a pipelaying vessel visits the spoolbase to be loaded, the stalks are welded together successively end-to-end to create a continuous length of pipe as the pipe is being wound onto the reel of the vessel.

Known swaged PiP connection arrangements disclosed in WO 2008/053251 and U.S. Pat. No. 6,446,321 are not suitable for reel-lay operations because the sleeve protruding radially from the outer pipe creates a significant overthickness that precludes reeling after welding. This denies the advantages of swaged PiP solutions to reel-lay applications.

GB 2453438 relates to thermal insulation of a screw-threaded junction between PiP sections. GB 2191842 discloses an end wall arrangement for PiP sections that also involves screw threads. No concern for reelability is apparent in either document.

WO 2009/085051 discloses a coupling system but this is for lined pipe sections rather than for PiP sections.

There remains a need for a reelable PiP solution with a pressure-tight barrier that allows a simple fabrication process while maintaining thermal insulation based on a reduced pressure within the annulus. Such a durable, easy-to-fabricate and reelable leak-tight solution did not exist before the present invention.

It is against this background that the present invention has been devised.

BRIEF SUMMARY OF THE INVENTION

In a broad sense, the invention resides in a reelable connection between facing ends of opposed pipe sections, each pipe section being of pipe-in-pipe construction comprising an inner pipe disposed within, and extending longitudinally along, an outer pipe that defines an outer pipe diameter; wherein:

an end wall connects the inner and outer pipes of each pipe section to seal an end of an annular space defined between those pipes;

the inner pipe of each pipe section protrudes longitudinally beyond the end wall and the outer pipe of that pipe section and is joined to an inner pipe of the opposed pipe section, leaving opposed ends of the outer pipes of the pipe sections spaced longitudinally from each other; and a substantially flush insert disposed between the opposed ends of the outer pipes maintains the outer pipe diameter from one pipe section to the other pipe section across the connection.

The insert is preferably a tubular shell spaced outside the inner pipe leaving a void between the shell and the inner pipe that is filled with an insulating material such as resin.

The end wall of each pipe section may be integral with the outer pipe, for example by being swaged toward the inner pipe, and is advantageously welded to the inner pipe by a full-penetration weld. Alternatively, the end wall may be defined by a bulkhead component attached to the outer pipe and the inner pipe. In an example to be described, the end wall is integral with a ring portion of the bulkhead component that shares the outer pipe diameter and lies between the outer pipe and the insert.

To reduce thermal bridging, the end wall is preferably inclined in longitudinal section relative to a longitudinal axis of the outer pipe, for example by flaring away frusto-conically from the inner pipe to the outer pipe moving away from the opposed pipe section.

In examples to be described, the end wall lies beyond the outer pipe and an outer end of the end wall suitably coincides with an end of the outer pipe; the end wall preferably also extends from within the insert at the inner pipe to outside the insert at the outer pipe. In those examples, the end walls of the pipe sections lie between the insert and the outer pipes of the pipe sections at the outer pipe diameter.

For strength and for ease of assembly, the end walls of the pipe sections advantageously support the insert in a substantially flush position with respect to the outer pipe diameter of the opposed pipe sections.

At the outer pipe diameter, ends of the insert are suitably spaced from the end walls or from the outer pipes of the opposed pipe sections to define weld gaps. Those weld gaps are preferably used to weld the insert to the end walls or to the outer pipes by fillet welds.

The inventive concept embraces a reelable, reeled or reel-laid pipeline or a reelable pipe stalk comprising two or more pipe sections of PiP construction joined by at least one connection of the invention. For example, the pipe sections may be pipe stalks having end walls at each end and otherwise comprising PiP pipe joints joined in conventional manner. In that case, a continuous annular space may extend between neighbouring pipe joints of the pipe stalks.

The inventive concept also embraces a pipeline after unreeling, the pipeline comprising two or more pipe sections of PiP construction joined by at least one connection of the invention, and further comprising at least one insulating sleeve around the connection. Such a sleeve is preferably longer than the insert so that ends of the sleeve overlap ends of the insert and overlie the outer pipes of the opposed pipe sections. Moreover, to reduce heat transmission, intersections between the end walls and the outer pipes of the opposed pipe sections advantageously lie within the sleeve.

The invention may also be expressed as a corresponding method of reeling a pipe comprising pipe sections of pipe-in-pipe construction, each pipe section comprising an inner pipe disposed within an outer pipe that defines an outer pipe diameter and connected to the outer pipe by an end wall that seals an annular space defined between those pipes. That method comprises making a connection between pipe sections by: joining the inner pipe of each pipe section to an inner pipe of an adjoining pipe section while leaving opposed facing ends of the outer pipes of those pipe sections spaced longitudinally from each other; positioning an insert to lie substantially flush between the opposed facing ends of the outer pipes to maintain the outer pipe diameter from one pipe section to the other pipe section across the connection; and subsequently winding the pipe sections joined by the connection onto a reel.

A void between the insert and the inner pipe is suitably filled with an insulating material before winding the pipe sections joined by the connection onto the reel.

The method may also include subsequently unwinding the pipe sections joined by the connection from the reel and straightening the unwound pipe sections, and preferably also fixing at least one insulating sleeve around the connection after straightening.

The method of the invention may involve drawing down pressure in the annular space of at least one pipe section before joining that pipe section to another pipe section, or alternatively at some later stage before laying the pipe, after reeling the pipe.

The end walls defined by swaging or attaching bulkhead components may be provided at ends of each pipe stalk after the pipe stalk has been fabricated from a plurality of pipe joints.

Inventive content also resides in using the end walls to support the insert in a flush position, which may be expressed as a method of fabricating a reelable pipe from pipe sections of pipe-in-pipe construction, each pipe section comprising an inner pipe disposed within an outer pipe and connected to the outer pipe by an end wall that seals an annular space defined between those pipes, the method comprising joining the inner pipe of each pipe section to an inner pipe of an adjoining pipe section, leaving opposed facing ends of the outer pipes of those pipe sections spaced longitudinally from each other; and supporting an insert on the end walls of those pipe sections to lie substantially flush between the opposed facing ends of the outer pipes to maintain the outer pipe diameter from one pipe section to the other pipe section.

The insert is conveniently assembled from pieces such as half-shells that are attached to each other while they are supported on the end walls. The insert may then be welded to the end walls and/or to the outer pipes using simple fillet welds.

The invention provides compartmented PiP stalks that can be prepared partly in advance with the annulus drawn down to reduced pressure in an onshore yard such as a spoolbase, off the critical path of the pipelaying vessel. The PiP stalks are then welded together end-to-end as the vessel is in station at the spoolbase, with circumferential girth welds between inner pipe sections being used to extend the flow-line. A combination of girth welds and longitudinal welds are used to fabricate and attach a shell around the weld in the flowline in alignment with the outer diameter (OD) of the outer pipe. Opposed half shells of semi-circular cross-section are suitably brought together and welded into the required position between the two closed ends of the outer pipe.

Whilst reel-lay requires substantially flush connections where pipe joints and pipe stalks are welded together, connection time is less critical than for J-lay or S-lay techniques, which involve offshore fabrication. As noted above, most connection operations between pipe joints can be performed at the spoolbase to form stalks while a pipelaying vessel is away on operations. PiP joints, in particular, can be welded together by sliding the outer pipe section over the inner pipe section after the inner pipe connection has been performed. The outer pipe connection is then made. There is time to perform these two welds per connection onshore while fabricating stalks, without affecting the availability of the pipelaying vessel. Relatively few stalk-to-stalk connections are required while the pipelaying vessel is at the spoolbase being loaded.

The connection is completed by encasing the weld in the flowline with a resin or other insulating filler material that fills the annular void around the weld between the shell, the protruding ends of the inner pipe sections and the ends of the outer pipe sections. An epoxy resin or other filler material such as polyurethane may be used. On completion of the connection in this way, the pipe stalk is wound onto the reel of the pipelaying vessel and the process is repeated for subsequent PiP stalks as necessary.

In preferred aspects, the invention dissociates the functions of the sliding sleeve of the prior art so as to address separately its mechanical function and its thermal insulation function. Mechanical continuity is achieved by welding a thin and substantially flush—and thus reelable—shell between opposed spaced ends of the outer pipe sections. Thermal continuity is achieved by adding an external insulating sleeve after the pipe is unwound from a reel on the pipelaying vessel and straightened ready to be launched into the sea.

BRIEF DESCRIPTION OF THE SEVERAL VIEWS OF THE DRAWINGS

In order that this invention may be more readily understood, reference will now be made, by way of example, to the accompanying drawings in which.

DETAILED DESCRIPTION OF THE INVENTION

Figure 1:
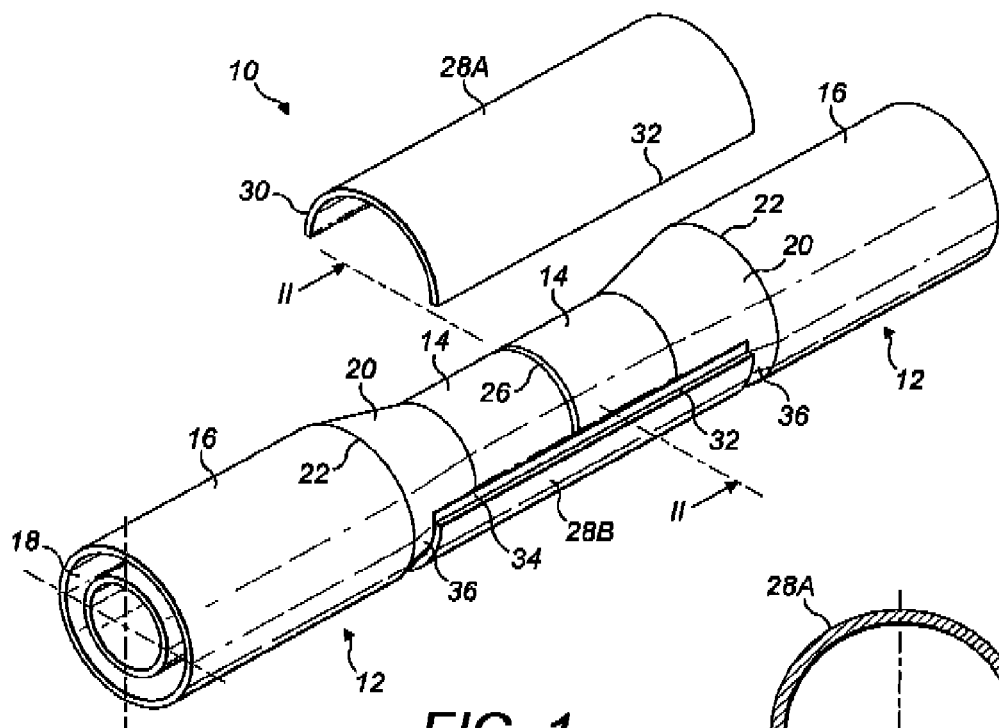
FIG. 1 is a perspective view of a PiP connection arrangement in accordance with the invention, partially disassembled.

Referring firstly to FIGS. 1 to 5 of the drawings, a connection 10 is made between abutting ends of PiP stalks 12. Each stalk 12 comprises an inner pipe 14 and an outer pipe 16 in concentric relation, spaced from each other along most of their length to define an annulus 18 between them.

In general, as will be explained later with reference to FIG. 6, the stalks 12 will be fabricated some time before they are welded to each other for reeling. During fabrication, opposed ends of the annulus 18 extending along the stalk 12 are closed and sealed by end walls 20 that bridge the gap between the outer pipe 16 and the inner pipe 14.

The solid, non-porous end walls 20 have three primary functions. Firstly, they are bulkheads providing a water stop seal in the event that the outer pipe 16 is ever breached and the annulus 18 floods with sea water. Secondly, they are leak-tight pressure barriers that allow the annulus 18 to be drawn down to a partial vacuum and for reduced pressure to be maintained in the annulus 18 throughout the service life of the pipeline. Thirdly, they are mechanical connections that have the principal responsibility for transmitting stresses between the inner and outer pipes 14, 16.

In this example, each end wall 20 is integral with the outer pipe 16 and is inclined or tapered inwardly toward the adjacent end of the stalk 12 in longitudinal sectional view, having been formed by swaging the outer pipe 16 conically toward the inner pipe 14. Thus, the end wall 20 starts at the circumferential swage line 22 where the outer diameter (OD) of the outer pipe 16 begins to reduce. The swage line 22 may be regarded as an intersection, step, discontinuity or junction between the outer pipe 16 and the end wall 20. Swaging may, for example, be performed using the techniques described in U.S. Pat. No. 6,446,321 and WO 2008/053251.

Swaging of the outer pipe 16 to create the end wall 20 may be performed after sleeving the outer pipe 16 onto the inner pipe 14—that is, when the outer pipe 16 is already around the inner pipe 14—or it may be performed on the outer pipe 16 alone, before the outer pipe 16 is sleeved onto the inner pipe 14. The inner edge of the end wall 20 at the longitudinal extremity of the outer pipe 16 is welded to the inner pipe 14 to seal the annulus 18, using a continuous circumferential full-penetration weld 24 as best seen in the enlarged detail view of FIG. 5. A gap of, say, 3 mm is suitably left between the end wall 20 and the inner pipe 14 to facilitate welding.

In each stalk 12, the outer pipe 16 is shorter than the inner pipe 14 such that an end of the inner pipe 14 protrudes beyond the weld 24 that joins the end wall 20 to the inner pipe 14. Thus, the weld 24 between the end wall 20 and the inner pipe 14 is inset from the end of the inner pipe 14. The protruding facing ends of the inner pipes 14 align and abut and are welded together by a circumferential butt weld 26 to extend the flowline, as best appreciated with reference to FIG. 4.

As can be seen in FIG. 1, the structure at this stage defines a circumferential recess that is longitudinally symmetrical about the butt weld 26 between the inner pipes 14 of the abutting stalks 12. Moving longitudinally in opposite directions away from the butt weld 26, the base of the recess is an exposed portion of the inner pipes 14 and the ends or sides of the recess are the opposed frusto-conical end walls 20 that flare out to the swage lines 22 where they reach the OD of the outer pipes 16.

Figure 2:
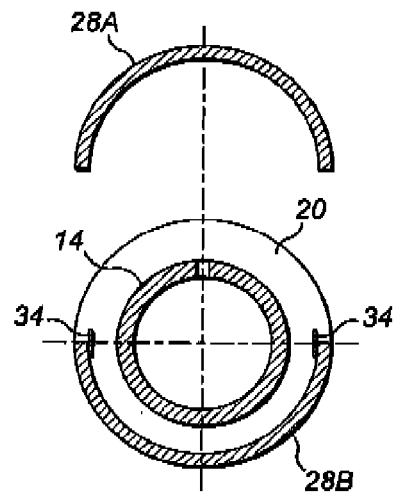
FIG. 2 is a cross-sectional view on line 11-11 of FIG. 1.

FIGS. 1 and 2 also show a tubular shell 28 being assembled around, and spaced from, the exposed inner pipes 14 to enclose the recess as a void. The shell 28 comprises two or more parts. In this example, the parts are opposed half-shells 28A, 28B each of semi-circular cross-section as best seen in FIG. 2, such that the shell 28, when assembled, is of circular cross-section and is of constant diameter along its length. Each half-shell 28A, 28B has curved end edges 30 and straight parallel side edges 32, all of which are suitably bevelled to facilitate welding.

Figure 3:
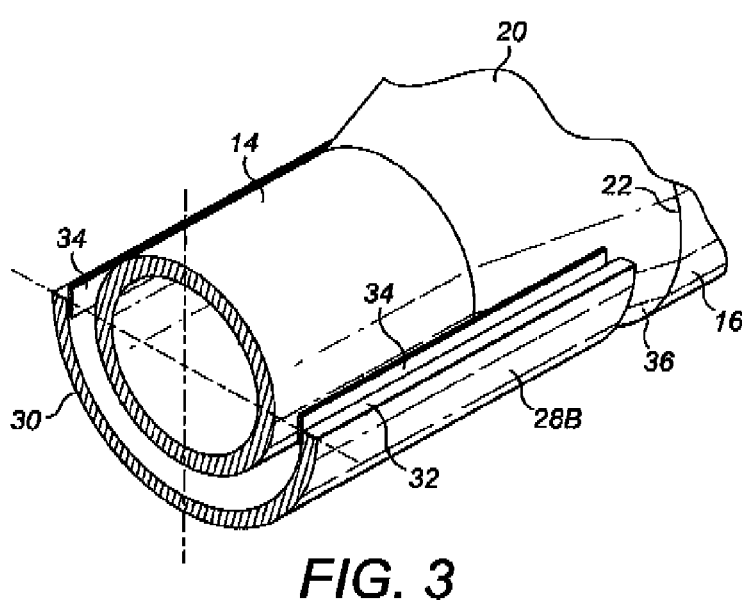
FIG. 3 is an enlarged detail perspective view of the PiP connection arrangement of FIG. 1, also sectioned on line 11-11.
Figure 4:
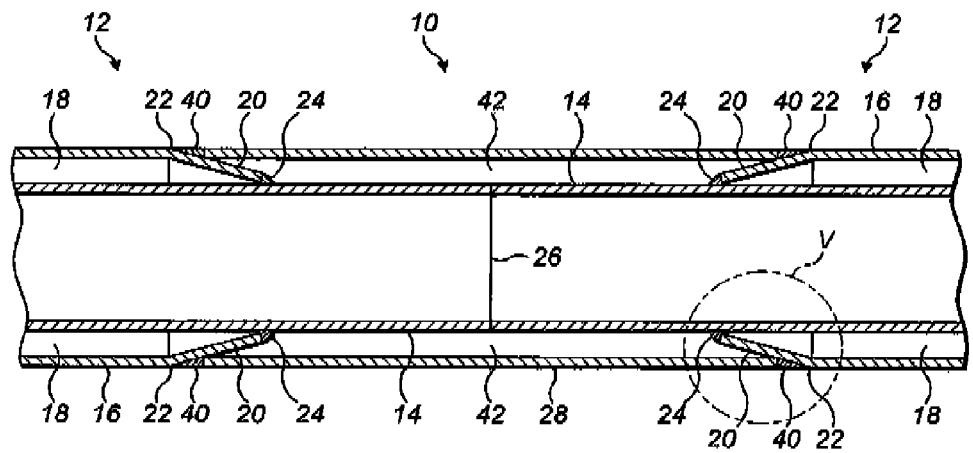
FIG. 4 is a longitudinally-sectioned side view of the PiP connection arrangement of FIG. 1, fully assembled.

The enlarged detail view of FIG. 3 best shows that one of the half-shells 28B has parallel flanges 34 of flat steel bar on its inner surface, extending along opposite side edges 32. On assembly of the shell 28, the flanges 34 are embraced by opposite side edges 32 of the opposed half-shell 28A to align the half-shells 28A, 28B. Longitudinal seam welds along the aligned side edges 32 of the opposed half-shells 28A, 28B then fix together the half-shells 28A, 28B to form the shell 28. It is preferred that the half-shells 28A, 28B are oriented with the respect to the assembled pipe such that the seam welds extend along the neutral axis when the pipe is bent for reeling.

The OD of the shell 28 corresponds to the OD of the outer pipe 16 so that the assembled pipe has a continuous outer surface of substantially uniform diameter to facilitate reeling. Of course, some tolerance is allowable in this respect and the design tolerance in this instance may be ±1 mm for example; it could be greater. Also, the wall thickness of the shell 28 is substantially the same as the wall thickness of the outer pipe 16 to emulate the mechanical properties of the outer pipe 16. This minimises discontinuity between adjacent stalks 12 of the pipe that may otherwise be problematic on deforming the pipe when the pipe is wound onto a reel and subsequently unwound from the reel and straightened.

The length of the shell 28 parallel to the longitudinal axis of the pipe is slightly less than the longitudinal spacing between the swage lines 22 at the junctions between the outer pipes 16 and the associated end walls 20. The resulting gaps 36 at each end of the shell 28 between the ends of the shell 28 and the outer pipes 16 are apparent in FIGS. 1 and 3.

Figure 5:
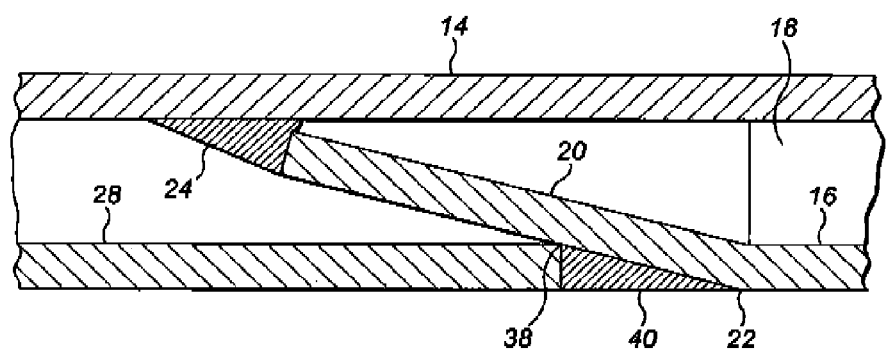
FIG. 5 is an enlarged view of detail V in FIG. 4.

As best shown in FIG. 5, the gaps 36 extend longitudinally to a sufficient extent that inner end edges 38 of the shell 28 can rest on the inclined end walls 20 while allowing the OD and thickness of the shell 28 to match the OD and thickness of the outer pipe 16. The gaps 36 also accommodate circumferential fillet welds 40 by which the shell 28 is attached at its ends to the end walls 20 adjacent the swage lines 22 at their junctions with the outer pipes 16.

The seam welds (not shown) and fillet welds 40 that assemble and affix the shell 28 are simple and quick to perform. Those welds are not critical to the leak-tightness of the annuli 18 or of the flowline defined by the inner pipes 14.

Once the shell 28 is complete, additional strength and thermal inertia is provided by using a resin 42 or other filler material to fill the annular void around the protruding abutting ends of the inner pipes 14 under the shell 28, between the end walls 20 of the outer pipes 16. Epoxy, PU or other filler material may be selected in accordance with the requirements of a project. The resin 42 can be injected through one or more small holes in the shell 28 that may be plugged after use. Once the resin 42 is cured, the connection 10 is then ready for reeling as part of the assembled pipe.

Figure 6:
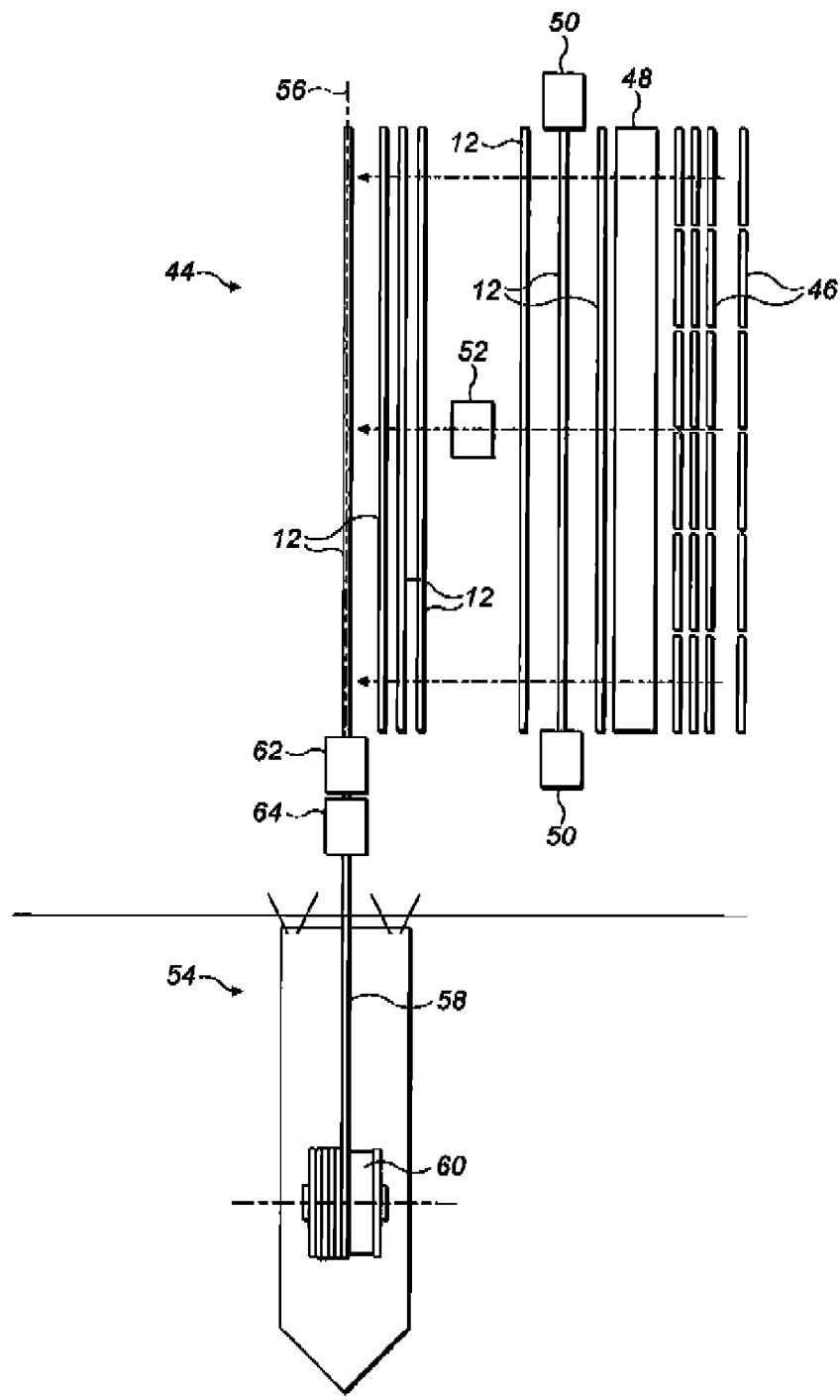
FIG. 6 is a schematic plan view of a spoolbase in which pipe joints are assembled into stalks in accordance with the invention, the stalks are assembled into a continuous pipe and the pipe is wound onto a reel of a pipelaying vessel.

To put the above processes into context, FIG. 6 illustrates the general arrangement of a spoolbase 44 in which, moving from right to left as shown:
- pipe sections or pipe joints 46 are added to storage stacks;
- the pipe joints 46 are taken from the storage stacks and welded together using well-known techniques to form PiP stalks 12 at welding, testing and coating stations shown collectively at 48;
- successive PiP stalks 12 are swaged and welded at their opposed ends by respective swaging and welding stations 50;
- air pressure in the annulus 18 of each swaged and welded PiP stalk 12 is drawn down by a pumping station 52, and a group of such stalks 12 is stored after their annuli 18 have been evacuated in this way; and
- when a pipelaying vessel 54 visits the spoolbase 44 to be loaded, evacuated PiP stalks 12 are moved successively from storage onto a firing line 56 at which the stalks 12 are added to the pipe 58 being wound onto the reel 60 of the vessel 54.

The firing line 56 includes a welding station 62 at which the inner pipes 14 of successive pipe stalks 12 are joined together and then the shell 28 is assembled and welded in place as described above. Downstream of the welding station 62, a further station 64 fills the void under the shell 28 with resin 42. Once the resin 42 has cured, the pipe 58 is wound onto the reel 60 and the process is repeated for the next PiP stalk 12.

Figure 7:
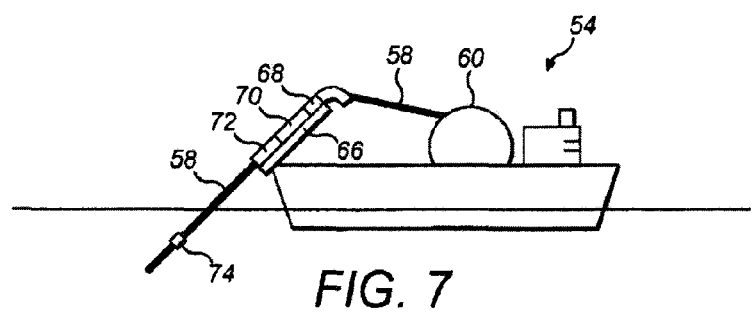
FIG. 7 is a schematic side view of the pipelaying vessel shown in FIG. 6 having now departed the spoolbase and in the process of laying pipe fitted with an insulating sleeve around the PiP connection arrangement shown in FIG. 4.

Moving on now to FIG. 7, this shows the pipelaying vessel 54 during a subsequent installation operation offshore. This drawing shows a lay ramp 66 at the stern of the vessel 54 where, conventionally, pipe 58 unwound from the reel 60 is straightened by a straightener 68 before passing through a tensioner 70 that supports the weight of the pipe string hanging between the vessel 54 and the seabed (not shown). At an insulating station 72 below the tensioner 70, an insulating sleeve or jacket 74 is fixed over the connection 10 to provide thermal insulation before the pipe 58 leaves the lay ramp 66 and is launched into the sea, carrying the sleeve 74 underwater with it.

Figure 8:
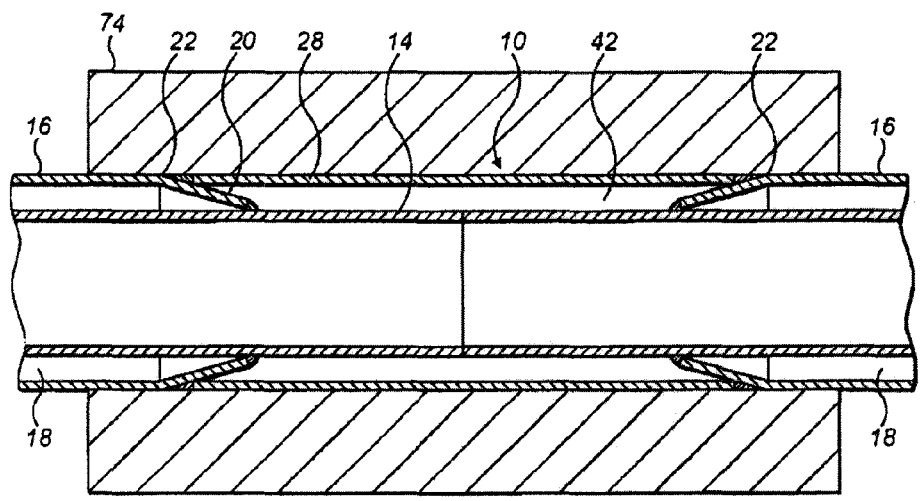
FIG. 8 is a longitudinally-sectioned side view of the PiP connection arrangement corresponding to FIG. 4, but showing the additional insulating sleeve seen in FIG. 7.

FIG. 8 shows the sleeve 74 around the connection 10 in more detail. The sleeve 74 is typically made of syntactic plastics and suitably comprises half-sleeves of semi-circular cross-section that are brought together in opposition around the shell 28 of the connection 10. There, they may be held together with clips or circumferential straps, not shown. As FIG. 8 makes clear, the sleeve 74 is longer than the shell 28 of the connection 10 and is centred longitudinally on the shell 28 so that ends of the sleeve 74 overlap ends of the shell 28 to overlie the outer pipes 16 of abutting pipe stalks 12.

The insulating sleeve 74 adds to the thermal inertia provided by the resin 42 or other filler material encasing the weld 26 in the inner pipes 14 that constitute the flowline. Where the PiP installation carries hot production fluids, this thermal inertia helps to meet criteria for cooldown time, which assures flow and avoids re-start problems by resisting hydrate formation or wax deposition during shutdowns.

It will be appreciated that in a PiP system that insulates the inner pipe 14 from the outer pipe 16, the end wall 20 extending between the inner pipe 14 and the outer pipe 16 is inevitably a thermal bridge that will tend to circumvent the insulation. In this respect, the taper of the end wall 20 is advantageous for the following reason. For a given thickness of resin 42 in the void between the inner pipe 14 and the shell 28—which thickness is largely determined by the spacing between the inner and outer pipes 14, 16—an end wall 20 inclined relative to the longitudinal axis of the pipe presents a much longer thermal transfer path than an end wall 20 that simply extends radially.

It will also be noted from FIG. 8 that the insulating sleeve 74 considerably overlaps the swage line 22 where the end wall 20 intersects with the OD of the outer pipe 16. This further lengthens the heat transfer path from hot production fluids to the cold surrounding water, through the inner pipe 14, through the end wall 20 and through the length of the outer pipe 16 that is insulated by the overlap of the sleeve 74.

The solution of the invention as described above provides true leak-tightness whilst reelability is ensured. Extensive testing and FEA calculations confirm that mechanical stresses and strains in the swaged ends remain acceptable during the reeling and straightening processes.

Many variations are possible within the inventive concept. For example the connection arrangement of the present invention may not necessarily be used only at the end of each stalk to allow each compartment of the PiP annulus to be drawn down to reduced pressure. Specifically, depending on design requirements, a similar arrangement may be confined only to the extremities of a PiP system if intermediate water stop or pressure reduction is not required along the length of the system. Conversely, if it is desired to sub-divide the PiP annulus of a pipe stalk into smaller compartments, it would be possible to use similar connections between some or all of the pipe joints (which expression includes multiple pipe joints such as double or quad pipe joints) that make up the pipe stalk.

Thus, the invention provides a reelable PiP solution that can be used in existing pipe fabrication facilities. It provides a durable pressure barrier to prevent water ingress and to maintain reduced pressure in the PiP annulus. It allows the annuli of PiP stalks to be drawn down to reduced pressure at the spoolbase, minimising offshore work. However, drawdown of pressure could instead be performed on the pipelaying vessel during transit to a pipelaying site if required. The swaging solution has no requirement for third-party fabrication or for additional components, although an alternative solution using a discrete end wall made by forging or other techniques is possible within the broad inventive concept as discussed.

The invention claimed is:

1. A reelable connection between facing ends of opposed pipe sections of a subsea pipeline, the connection being configured to be reeled and then subsequently unreeled from a pipeline reel to return to its original shape, each pipe section being of pipe-in-pipe construction comprising an inner pipe disposed within, and extending longitudinally along, an outer pipe that defines an outer pipe diameter; wherein:
   the outer pipe includes an end wall that is defined by an inwardly-inclined end portion of the outer pipe and is formed as a one-piece, homogeneous structure with the outer pipe, the end wall connecting the inner and outer pipes of each pipe section to seal an end of an annular space defined between those pipes;
   the inner pipe of each pipe section protrudes longitudinally beyond the end wall and the outer pipe of that pipe section and is joined to an inner pipe of the opposed pipe section, leaving opposed ends of the outer pipes of the pipe sections spaced longitudinally from each other; and
   a substantially flush insert disposed between the opposed ends of the outer pipes maintains the outer pipe diameter from one pipe section to the other pipe section across the connection to facilitate reeling and unreeling of the pipe sections, wherein the insert has one end welded to one of the opposed outer pipes or to the end wall of that outer pipe, and another end welded to the other of the opposed outer pipes or to the end wall of that other outer pipe.

2. The reelable connection of claim 1, wherein the end wall is swaged toward the inner pipe.

3. The reelable connection of claim 1, wherein the end wall is welded to the inner pipe by a full-penetration weld.

4. The reelable connection of claim 1, wherein the end wall is inclined in longitudinal section relative to a longitudinal axis of the outer pipe.

5. The reelable connection of claim 4, wherein the end wall flares away from the inner pipe to the outer pipe moving away from the opposed pipe section.

6. The reelable connection of claim 1, wherein an outer end of the end wall coincides with an end of the outer pipe.

7. The reelable connection of claim 1, wherein the end wall extends from within the insert at the inner pipe to outside the insert at the outer pipe.

8. The reelable connection of claim 1, wherein the end wall lies beyond the outer pipe.

9. The reelable connection of claim 1, wherein the end walls of the pipe sections support the insert substantially flush with the outer pipe diameter of the opposed pipe sections.

10. The reelable connection of claim 1, wherein the end walls of the pipe sections lie between the insert and the outer pipes of the pipe sections at the outer pipe diameter.

11. The reelable connection of claim 1, wherein, at the outer pipe diameter, end edges of the insert are spaced from the end walls or from the outer pipes of the opposed pipe sections to define weld gaps.

12. The reelable connection of claim 1, wherein the insert is welded to the end walls or to the outer pipes by fillet welds.

13. The reelable connection of claim 1, wherein the insert is a tubular shell spaced outside the inner pipe leaving a void between the shell and the inner pipe that is filled with an insulating material.

14. A reelable, reeled or reel-laid pipeline or a reelable pipe stalk comprising two or more pipe sections of pipe-in-pipe construction joined by at least one reelable connection between facing ends of opposed pipe sections of the pipeline, the connection being configured to be reeled and then subsequently unreeled from a pipeline reel to return to its original shape, each pipe section being of pipe-in-pipe construction comprising an inner pipe disposed within, and extending longitudinally along, an outer pipe that defines an outer pipe diameter; wherein:
   the outer pipe includes an end wall that is defined by an inwardly-inclined end portion of the outer pipe and is formed as a one-piece, homogeneous structure with the outer pipe, the end wall connecting the inner and outer pipes of each pipe section to seal an end of an annular space defined between those pipes;
   the inner pipe of each pipe section protrudes longitudinally beyond the end wall and the outer pipe of that pipe section and is joined to an inner pipe of the opposed pipe section, leaving opposed ends of the outer pipes of the pipe sections spaced longitudinally from each other; and
   a substantially flush insert disposed between the opposed ends of the outer pipes maintains the outer pipe diameter from one pipe section to the other pipe section across the connection to facilitate reeling and unreeling of the pipe sections, wherein the insert has one end welded to one of the opposed outer pipes or to the end wall of that outer pipe, and another end welded to the other of the opposed outer pipes or to the end wall of that other outer pipe.

15. A pipeline comprising two or more pipe sections of pipe-in-pipe construction joined by at least one connection as defined in claim 14, wherein the pipe sections are pipe stalks having end walls at each end and comprising pipe joints joined by sliding an outer pipe of a pipe joint over an inner pipe of that pipe joint when the inner pipe has been connected to an inner pipe of a neighboring pipe joint.

16. The pipeline of claim 15, wherein a continuous annular space extends between neighboring pipe joints of the pipe stalks.

17. A pipeline after unreeling, the pipeline comprising two or more pipe sections of pipe-in-pipe construction joined by at least one connection as defined in claim 14, and further comprising at least one insulating sleeve around the connection.

18. The pipeline of claim 17, wherein the sleeve is longer than the insert so that ends of the sleeve overlap ends of the insert and overlie the outer pipes of the opposed pipe sections.

19. The pipeline of claim 17, wherein intersections between the end walls and the outer pipes of the opposed pipe sections lie within the sleeve.

20. A method of reeling a pipe comprising pipe sections of a subsea pipeline of pipe-in-pipe construction, each pipe section comprising an inner pipe disposed within an outer pipe that defines an outer pipe diameter and connected to the outer pipe by an end wall that is defined by an inwardly-inclined end portion of the outer pipe and formed as a one-piece, homogeneous structure with the outer pipe, the end wall connecting the inner and outer pipes to seal an annular space defined between those pipes, the method comprising:

making a connection between pipe sections by:
joining the inner pipe of each pipe section to an inner pipe of an adjoining pipe section while leaving opposed facing ends of the outer pipes of those pipe sections spaced longitudinally from each other;
positioning an insert to lie substantially flush between the opposed facing ends of the outer pipes to maintain the outer pipe diameter from one pipe section to the other pipe section across the connection to facilitate reeling and unreeling of the pipe sections, wherein the insert has one end welded to one of the opposed outer pipes or to the end wall of that outer pipe, and another end welded to the other of the opposed outer pipes or to the end wall of that other outer pipe; and
subsequently winding the pipe sections joined by the connection onto a reel, the connection returns to its original shape once unreeled from a pipeline reel.

21. The method of claim 20, comprising filling a void between the insert and the inner pipe with an insulating material before winding the pipe sections joined by the connection onto the reel.

22. The method of claim 20, comprising drawing down pressure in the annular space of at least one pipe section before joining that pipe section to another pipe section.

23. The method of claim 20, comprising drawing down pressure in the annular space of at least one pipe section after reeling the pipe.

24. The method of claim 20, comprising swaging an end of an outer pipe inwardly and welding the swaged end to an inner pipe to provide the end wall.

25. The method of claim 20, comprising fabricating the pipe sections as pipe stalks comprising a plurality of pipe joints and subsequently providing the end walls at ends of each pipe stalk.

26. The method of claim 20, comprising subsequently unwinding the pipe sections joined by the connection from the reel and straightening the unwound pipe sections.

27. The method of claim 26, comprising fixing at least one insulating sleeve around the connection after straightening.

* * * * *